Figure 2:
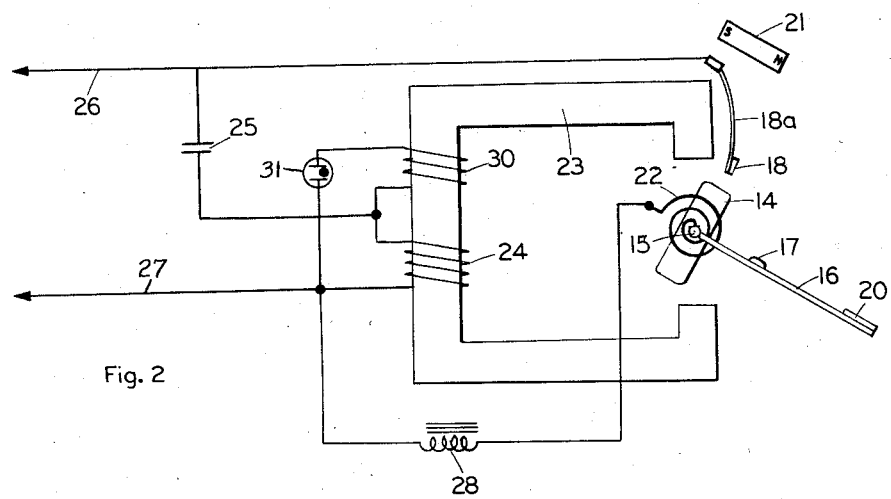

July 28, 1959 D. M. LONGENECKER ET AL 2,897,412
PULSE RESPONSIVE RELAY
Filed Dec. 28, 1955

Inventors:
Daniel M. Longenecker
Harvey H. Chamberlain
by, Richard E. Hosley
Their Attorney

United States Patent Office 2,897,412
Patented July 28, 1959

2,897,412

PULSE RESPONSIVE RELAY

Daniel M. Longenecker, Reading, and Harvey H. Chamberlain, Marblehead, Mass., assignors to General Electric Company, a corporation of New York Application December 28, 1955, Serial No. 555,969

2 Claims. (Cl. 317—147)

This invention relates to electrical relays and, more particularly, to such a relay that is responsive to pulses of electrical oscillations, the oscillations having a predetermined frequency and the pulses having a predetermined repetition frequency.

There are numerous applications in which it is desirable to have an electrical relay that responds only to electrical signals consisting of pulses of oscillations, the oscillations having a predetermined frequency hereafter referred to as carrier wave frequency and the pulses having a predetermined repetition frequency, and does not respond to signals having other than those particular frequency characteristics. For example, there is interest at present in providing an alarm for use in connection with civilian defense activities. It is desirable to connect the alarm into the ordinary 60 cycle household current supply with the alarm responsive to certain signals that would be superimposed on the 60 cycle supply and unresponsive to all other signals that might be present on the supply lines, as well as unresponsive to the 60 cycle current itself.

At present it is customary in some areas to superimpose on the conventional 60 cycle supply voltage pulses of 720 cycle oscillations to turn on and off water heaters, street lights and other irregularly energized devices. Therefore, in order to utilize available 720 cycle oscillation producing equipment, it is desirable to provide a civilian alarm device that is responsive to oscillations of that frequency that may be provided as pulses having a predetermined fixed repetition frequency. Accordingly, a primary object of the present invention is to provide a relay suitable for use in a device such as a civilian alarm, which is responsive to pulses of alternating current having a predetermined carrier wave frequency and a predetermined pulse repetition frequency.

It is a further object of the invention to provide a pulse responsive relay that is not affected by continuous oscillations, by transient pulses, or by pulses of alternating current that do not have both a predetermined carrier wave frequency and a predetermined pulse repetition frequency.

A pulse responsive relay of a type suitable for embodiment in an alarm system preferably is responsive to pulses of alternating current having predetermined frequency characteristics, but varying over a wide range of amplitudes. Therefore, another object of the present invention is to provide a relay that responds to pulses of alternating current that may vary in peak amplitude over a range of approximately ten to one.

A civilian alarm in order to be most effective should be of the type that once actuated remains in that condition until it is reset. This, of course, is necessary to ensure that the alarm rings for a sufficient length of time to warn all the occupants of a building in which the alarm is installed. Accordingly, a further object of the present invention is to provide a pulse responsive relay which, having been actuated, remains in its actuated condition until reset.

In accordance with the invention, a relay responsive to pulses of electrical oscillations having a predetermined carrier wave frequency and a predetermined pulse repetition frequency comprises a movable magnetic vane having switch means associated therewith and arranged to be open when the vane is in a first position and closed when it is in a second position. Electromagnetic means are connected to be energized by the electrical pulses and are arranged to urge the vane away from its first position against the force exerted by biasing means to maintain the vane in its first position. The electromagnetic means includes a circuit tuned to the carrier wave frequency and a moving system, comprising the magnetic vane, the switch means and the biasing means, which is mechanically resonant at the repetition frequency of the pulses.

As pulses of electrical oscillations having the proper frequency characteristics energize the electromagnetic means, pulsating force is exerted on the magnetic vane which moves in synchronism with the applied pulses at an ever increasing amplitude until it reaches its second position. Means are provided for holding the vane in the second position once it is reached, and the vane must be reset to the first position.

Limiting means may be provided in connection with the electromagnetic means substantially to limit the force exerted on the magnetic vane when the amplitudes of the applied pulses exceed a predetermined level.

Figure 1:
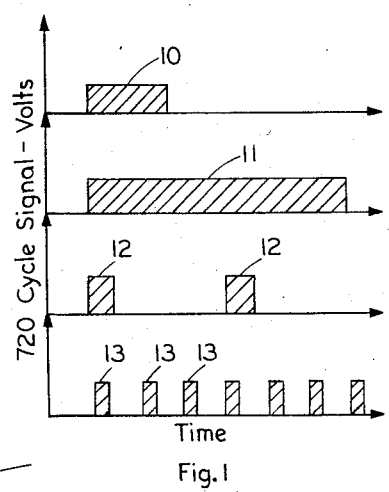
Figure 3:
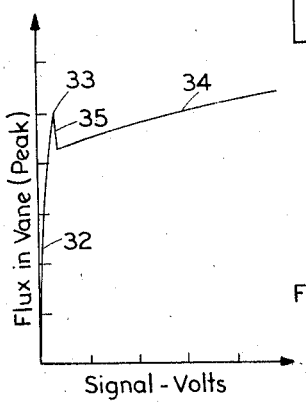

For a better understanding of the invention, together with further objects and advantages thereof, reference is made to the following description taken in conjunction with the accompanying drawing, in which Fig. 1 is a graph showing typical examples of various types of electrical pulses presently superimposed on 60 cycle supply lines along with the type proposed for use with the relay of the invention;

Fig. 2 is a diagrammatic view of one embodiment of the relay of the invention; and Fig. 3 is a graph useful in understanding the operation of the relay shown in Fig. 2.

Although the relay of the invention is described hereafter in connection with a civilian alarm system designed to be actuated by pulses of 720 cycle alternating current, it is understood that the relay is in no way limited to any particular use, nor is it to be considered limited in its responsiveness to signals having any particular frequency characteristics, other than those for which a specific embodiment is designed.

It is customary in some localities, particularly in the larger cities, to utilize conventional 60 cycle supply lines to carry various control signals which are superimposed on the 60 cycle current. It has been the practice to utilize pulses of 720 cycle alternating current for those control signals because such pulses, in general, have little or no effect on the devices that are normally energized by the 60 cycle current. For example, a pulse of 720 cycle current, represented by curve 10 in the graph of Fig. 1, may be used to turn on electric water heaters during periods when the 60 cycle supply is not otherwise heavily loaded. Such a signal may last several seconds. When it is desired to turn off the water heaters, a longer pulse, represented by curve 11, may be transmitted over the 60 cycle supply lines. The control devices at the water heaters are sensitive to the lengths of the pulses to turn the heaters on or off. Similarly, other devices such as street lights and the like may be turned on and off by relatively short pulses of 720 cycle current, such as represented by curves 12. Generally, only two control pulses of the latter type are used and the control devices respond to the time interval between the two pulses.

It has been proposed that pulses of 720 cycle current, such as represented by curves 13, be utilized to energize a civilian alarm that may be connected into the 60 cycle power supply available in homes and places of business.

Such pulses might be relatively short, say of the order of ⅓ second each, and would have a regular pulse repetition frequency, such as one pulse per second. The present invention provides a relay that is responsive to pulses of oscillations of the type represented by the curves 13, and is not responsive to continuous oscillations or to irregularly spaced pulses of oscillations of the types represented by the curves 10, 11, and 12.

Referring now to Fig. 2, it is seen that the relay of the invention comprises a movable magnetic member, in this case an elongated magnetic vane 14, which is preferably of laminated construction, conventionally mounted to pivot about the point 15 with relatively little friction. The vane 14 carries a contact arm 16 which has mounted thereon an electrical contact 17 arranged to engage a fixed electrical contact 18, when the vane 14 and arm 16 are rotated in a counterclockwise direction from the position shown in Fig. 2. When the arm 16 is rotated so that the contacts 17 and 18 are closed, a small piece 20 of magnetic material secured to the outer end of the contact arm 16 is located adjacent a fixed permanent magnet 21, which attracts the piece 20 and holds the arm in that position. The contact 18 may be mounted on a spring 18a, so that the contact 18 will be firmly engaged by the contact 17 when the arm 16 is rotated to its upper position.

The vane 14, carrying contact arm 16, is biased to a position approximately as shown in the drawing by means of a hair spring 22. The assembly comprising the vane 14, the arm 16 with the elements mounted thereon, and the hair spring 22 are designed by conventional techniques to be mechanically resonant as a system at the repetition frequency of the pulses of oscillations to which the relay is to respond.

Electromagnetic means are provided to rotate the vane in a counterclockwise direction to move the arm 16 to its upper or contact-engaging position in response to pulses of the predetermined carrier wave frequency and pulse repetition frequency. The electromagnetic means comprise a magnetic core 23, of substantial C shape and preferably of laminated construction, having an energizing coil 24 wound thereon for producing magnetic flux in the core. The magnetic vane 14 is arranged in flux-linking relationship with the core 23 in the air gap thereof.

The energizing coil 24 is connected in series with a capacitor 25 between conductors 26 and 27 over which the pulses to which the relay responds are transmitted. In the present case, it is assumed for purposes of illustration that the conductors 26 and 27 are conventional household 60 cycle supply lines.

The reactance values of the capacitor 25 and the energizing coil 24 are such that they are tuned to series resonance at the frequency of the carrier wave of the pulse, so that when the pulses of oscillations to which the relay is to respond are transmitted over the conductors 26, 27 to the relay a large current flows through the capacitor 25 and the energizing coil 24. Thus, a large amount of magnetic flux is produced in the magnetic core 23, part of which also passes through the magnetic vane 14 and exerts torque to rotate the vane 14 in a counterclockwise direction against the force exerted by the spring 22. At the end of the pulse, the hair spring 22 rotates the vane in a clockwise direction. Then, when the next pulse is received, the vane is again rotated in a counterclockwise direction, and so on until the vane 14, swinging in synchronism with the applied pulses at an ever increasing amplitude, swings far enough in a counterclockwise direction for the contacts 17, 18 to engage and the magnetic piece 20 to contact the permanent magnet 21. It has been found that three to ten pulses are required to close the contacts. At that time, the force exerted by the hair spring 22 is insufficient to overcome the attracting force of the permanent magnet 21, and the vane 14 and arm 16 remain in position with contacts 17 and 18 closed.

For purposes of illustration, the contact 18 is shown connected to the conductor 26 and the contact 17 is shown connected through the arm 16, the vane 14 and the spring 22 to one end of an energizing coil 28 of a buzzer, bell, relay or other alarm device, the other end of which is connected to the conductor 27. Thus, when the contacts 17 and 18 are closed, a circuit is completed from the conductor 26 through the alarm device energizing coil 28 to the conductor 27. The alarm will continue to be energized until the contact arm 16 is manually rotated in a clockwise direction and the contacts 17 and 18 opened. Of course, the contacts 17, 18 may be connected into any desired electrical circuit, and the invention is not limited to the circuit illustrated.

It is pointed out that a steady or non-pulsating alternating current flowing through the energizing coil 24 will not cause the relay to close unless the current is unusually large. This occurs because the contact arm 16 is mounted on the vane 14 in such a position that the vane must swing beyond its position of maximum flux-linking relationship with the core 23 before the contacts 17 and 18 are closed. In other words, the energizing coil 24 must be energized by pulses having a repetition frequency substantially the same as the mechanical resonant frequency of the moving system before the contact arm 16 will be swung far enough to close the contacts 17 and 18. For this same reason, the relay does not respond to pulses having the proper carrier frequency but having a repetition frequency different from the mechanical resonant frequency of the moving system.

It is also pointed out that the relay will not be actuated by pulses having the proper repetition frequency but the wrong carrier wave frequency, because the capacitor 25 and energizing coil 24 are tuned to series resonance for one particular frequency. At that particular frequency, a large current flows through the coil 24, a large amount of magnetic flux is produced in the core 23 and a relatively large torque is exerted on the vane 14 to rotate it against the force of the spring 22; at any other carrier wave frequency, the current flowing through energizing coil 24 is relatively low, little flux is produced in core 23 and the small torque exerted on the magnetic vane 14 is insufficient to rotate the vane against the force of the spring 22.

In order to be of maximum utility, a relay of the pulse responsive type should be capable of responding to signals having the proper frequency characteristics, but having amplitudes varying over a wide range. For example, for use in a civilian defense alarm, it is desirable to have the relay respond to signals varying in peak amplitude from 1.5 to 15 volts. If the relay thus far described is made sensitive enough to respond to a train of pulses having amplitudes of 1.5 volts, it is likely that it would respond to a single 15 volt pulse, and energize the alarm falsely. In order to overcome the aforementioned difficulty, limiting means are provided substantially to limit the current flowing through the energizing coil 24 of the relay, and hence the torque exerted on the vane 14, when the amplitudes of the input pulses to the energizing coil 24 exceed a predetermined value.

In the present case, the limiting means comprise an auxiliary coil 30 wound on the core 23 in series with the energizing coil 24. A glow discharge device 31 is connected across the winding 30 and the energizing winding 24. The coils 24 and 30 are connected as an autotransformer, so that the voltage appearing across the two coils in series is more than the voltage appearing across the energizing coil 24. When an alternating current input pulse is not present or is present with a peak amplitude of approximately 1.5 volts or less, the voltage appearing across the coils 24 and 30 in series is insufficient to cause the glow discharge device 31 to conduct. Therefore, no current flows through the coil 30. However, when the alternating current input pulses have peak amplitudes greater than approximately 1.5 volts, the voltage appearing across the coils 24 and 30 is sufficient to cause the glow discharge device 31 to conduct, which substantially limits the current flowing through the energizing coil 24 and hence tends to limit the flux produced in the core 23 and vane 14. This is illustrated by Fig. 3, which is a graph having values of flux in the vane 14 as ordinate and alternating current input pulse peak amplitude (volts) as abscissa.

It is seen from curve 32 that the flux in the vane 14 rises rapidly as the alternating current pulse increases in peak amplitude up to approximately 1.5 volts. When the pulse reaches a peak amplitude of approximately 1.5 volts, as at 33, the glow discharge device 31 fires, and thereafter the flux in the vane 14 increases relatively slowly, as shown by curve 34. The drop in flux in the vane, shown at 35, occurs because somewhat higher voltage is required to fire the discharge device 31 than to maintain conduction after it has fired. It has been found in practice that the flux in the vane is only 17% greater when the alternating current pulse has a peak amplitude of 15 volts than when it has a peak amplitude of 1.5 volts.

The action of the limiting means comprising the coil 30 and the glow discharge device 31 is somewhat complex. The series-tuned circuit is designed to have a high Q (ratio of reactance to resistance) in order to cause a large current to flow therethrough at the resonant frequency and produce a large amount of magnetic flux in the core 23. However, when the discharge device 31 conducts, a resistive loss is introduced into the circuit, consequently the Q of the circuit is lowered, and the current drawn from the line is effectively limited. In addition to lowering the Q of the circuit, the coil 30 and discharge device 31 also detune somewhat the series resonant circuit comprising the energizing coil 24 and the capacitor 25. This occurs because of the resistance that is placed in parallel with the energizing coil 24 when the discharge device 31 conducts, which changes the inductive reactance of the energizing coil 24. Also, when the discharge device 31 conducts, the current flowing through the coil 30 is in a direction to produce flux that opposes the flux developed through the action of the energizing coil 24. It is believed that the limiting action is due to all of these effects.

It is apparent that other limiting means might be used rather than the coil 30 and discharge device 31. For example, if the voltage appearing across the energizing coil 24 at resonance is high enough to fire the discharge device 31, the coil 30 may be omitted and the discharge device 31 connected directly across the energizing coil 24. In that case, there would be no flux produced to oppose that due to the coil 24, so the limiting action would result only from substantially limiting the current flow through the coil 24 because of lowering the Q of the circuit by introducing a resistive loss therein, and because of detuning the series-tuned circuit.

The contacts 17 and 18 need not necessarily be located in the positions illustrated. If desired, the contact 18 and magnetic piece 20 may be mounted on the underside of the arm 16, and the contact 17 and magnet 21 arranged below the arm 16 rather than above it. In that case, the pulses to which the relay responds urge the vane 14 and arm 16 in a counterclockwise direction away from the closed-contact position. At the end of each energizing pulse, the spring 22 rotates the vane in a clockwise direction toward the position illustrated, but the contacts 17 and 18 do not close until the vane, swinging in synchronism with the applied pulses at ever increasing amplitudes, overshoots the position shown by a sufficient amount in a clockwise direction. That arrangement has the advantage that a single applied pulse drives the arm 16 away from the contact-closed position, so that the possibility of a false closing of the relay is decreased.

It is now apparent that the invention provides a pulse responsive relay that attains the objectives set forth. The relay is responsive only to pulses of alternating current having a predetermined carrier wave frequency and a predetermined pulse repetition frequency, and is not responsive to other signals. The pulses to which the relay is responsive may vary in amplitude over a wide range, and the action of the relay is unaffected by such variations. The relay responds to a series of three to ten pulses having the proper frequency characteristics, and once the relay has been actuated it remains in its actuated condition until it is reset.

The relay is not limited in its responsiveness to pulses having any particular widths, amplitudes, carrier frequencies or pulse repetition frequencies. The relay may be designed to respond to pulses having any desired characteristics, within reasonable limits obvious to one skilled in the art. The limiting means may be designed to respond to pulse amplitudes in excess of any reasonable predetermined value, not necessarily the value mentioned for the particular embodiment described herein. Furthermore, the arm 16 need not always carry a contact, because in some applications the movement of the arm might be utilized in ways other than merely to close contacts.

Many other changes and modifications may be made in the relay of the invention by one skilled in the art. Therefore, it is intended by the appended claims to cover all such modifications as fall within the true spirit and scope of the invention.

What we claim as new and desire to secure by Letters Patent of the United States is:

1. A relay responsive to electrical pulses having a predetermined repetition frequency and a predetermined carrier frequency comprising a pivotally mounted magnetic vane, switch means associated with said vane and arranged to be open when said vane is in a first position and closed when said vane is in a second position, means biasing said vane to said first position, said magnetic vane, said switch means and said biasing means being mechanically resonant as a system at said repetition frequency of said electrical pulses, electromagnetic means including a core and an energizing coil wound on said core and connected to be energized by said electrical pulses, a capacitor connected in circuit with said coil such that the capacitor and the coil form a series resonant circuit at the carrier frequency, said electromagnetic means being arranged to urge said vane away from said first position when said coil is energized by said electrical pulses and swing said mechanically resonant system including said vane in synchronism with said electrical pulses at ever increasing amplitudes until said vane reaches its said second position, means responsive only to said electrical impulses which have voltage amplitudes greater than a predetermined value for substantially limiting the electrical current flow through said energizing coil when the peak amplitudes of said electrical pulses exceed said predetermined value, and means associated with said vane to hold said vane in said second position.

2. A relay responsive to electrical pulses of alternating current having a predetermined carrier frequency and a predetermined repetition frequency comprising a pivotally mounted magnetic vane, an arm carried by said vane, a first contact mounted on said arm, a second contact arranged to be out of engagement with said first contact when said vane is in a first position and in engagement with said first contact when said vane is in a second position, spring means biasing said vane to said first position, said vane, said arm and said spring means being mechanically resonant as a system at said repetition frequency of said electrical pulses, a magnetic core, an energizing coil in flux producing relationship with said core and connected to be energized by said electrical pulses, a capacitor connected in series with said coil, said capacitor and coil being tuned to series resonance at said carrier frequency, said series-tuned circuit having a high Q at said carrier frequency, and said core being arranged in flux-linking relationship with said vane to urge said vane away from said first position when said coil is energized by said electrical pulses and swing said mechanically resonant system including said vane in synchronism with said electrical pulses at ever increasing amplitudes until said vane reaches its said second position, means connected across said energizing coil for substantially limiting the current through said energizing coil when the peak amplitude of said electrical pulses exceed a predetermined value, said last named means including an auxiliary coil connected in series with a glow discharge device, and magnetic means arranged to engage said arm to hold said vane in said second position when said second position is reached.

References Cited in the file of this patent
UNITED STATES PATENTS

| | | |
|---|---|---|
| 2,127,486 | Crosby | Aug. 16, 1938 |
| 2,479,964 | Pinkerton | Aug. 23, 1949 |
| 2,534,144 | Price | Dec. 12, 1950 |
| 2,724,074 | Welker | Nov. 18, 1955 |